William Clark's Imp't in Check and Harness Reins.
No. 73875. Patented Jan 28 1868
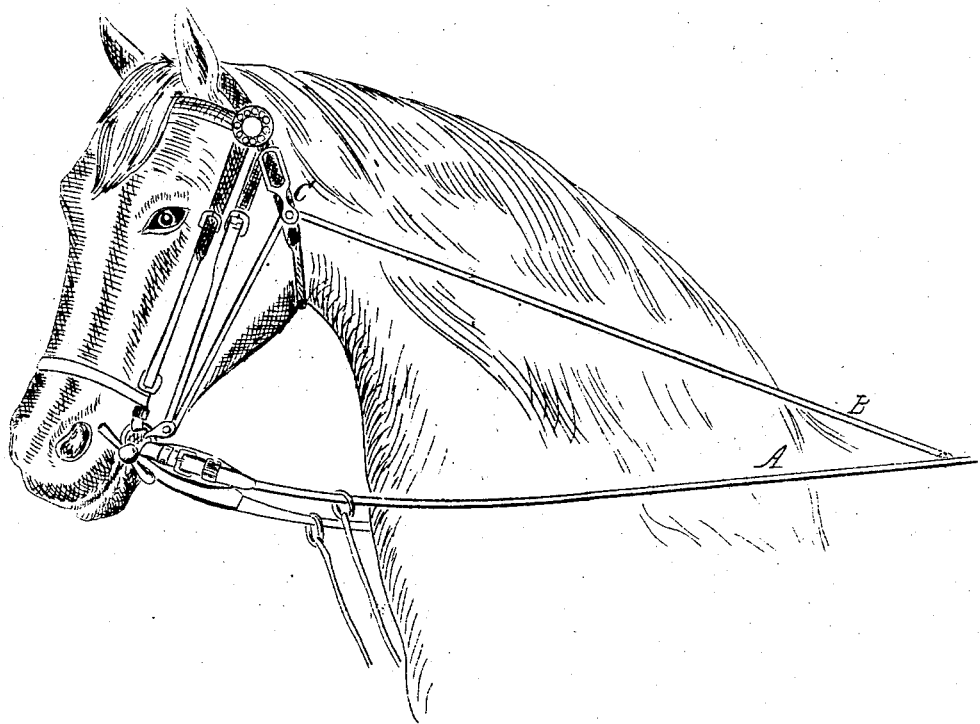
Witnesses:
Gustav Berg
John Lottler
Inventor:
William Clark

United States Patent Office.

WILLIAM CLARK, OF VALATIE, NEW YORK.

Letters Patent No. 73,875, dated January 28, 1868.

IMPROVED CHECK AND HARNESS-REINS.

*The Schedule referred to in these Letters Patent and making part of the same.*

TO ALL WHOM IT MAY CONCERN:

Be it known that I, WILLIAM CLARK, of Valatie, in the county of Columbia, in the State of New York, have invented a new and useful Improvement in Check-Reins; and I do hereby declare that the following is a full, clear, and exact description thereof, which will enable those skilled in the art to make and use the same, reference being had to the accompanying drawing, forming part of this specification; in which drawing—

Figure 1 is a side view of a bridle, to which my invention is applied.

Figure 2 shows a modification relating to the upper runner.

Similar letters indicate corresponding parts.

The object of this invention is to produce a check-rein which shall be wholly under the control and operation of the driver, by means of a main or driving-rein, the parts being so constructed and arranged that the horse can be checked and unchecked, at pleasure, without making any change in the attachments of the reins or bridle. By means of my invention a horse can be allowed to lower his head to drink, and be reined up again, without altering the check-rein or interfering with any of the fastenings of the bridle or the reins.

The letter A designates the main or driving-rein, whose ends are fastened, as usual, to the bit-rings, and B is the check-rein, there being one for each side of the bridle. The rear end of each check-rein is permanently fastened to that one of the lines of the main or driving-rein which is on the same side with it, and from thence said check-rein is taken forwards through the upper runner or pulley C, commonly called the gag-runner; thence downwards towards the bit-ring, through which, or through a runner or pulley attached thereto, it goes, and is taken thence upwards towards the gag-runner to a loop, on the inner side of which its end is fastened. The gag or upper runner C is attached by a buckle, or by other suitable means, to the billet for the throat-latch, extending down from the crown-piece.

The arrangement is the same for both sides of the horse's head, the check-reins being independent of each other, and extending from the billets for the throat-latch, downwards, to the bit-rings or to attachments thereon, thence up and through the gag-runners, whence they are taken backwards, and are fastened, as above stated, to the lines of the main or driving-rein.

By means of this improvement the driver can check and uncheck a horse by tightening or slackening, respectively, the main or driving-reins, so that the driver need not leave his seat to uncheck his horse.

What I claim as new, and desire to secure by Letters Patent, is—

The check-rein, fastened at one end to the main or driving-rein, and extending through a runner on the billet for the throat-latch; thence downwards and through the bit-ring, or a pulley connected to said ring; and thence upwards to the upper runner, where its other end is fastened, substantially as described.

This specification signed, this 12th day of November, 1867.

WILLIAM CLARK.

Witnesses:
GUSTAV BERG,
W. HAUFF.